US011533158B2

(12) United States Patent
Kang et al.

(10) Patent No.: US 11,533,158 B2
(45) Date of Patent: Dec. 20, 2022

(54) DEVICE FOR SELF-INTERFERENCE CANCELLATION OF FULL DUPLEX COMMUNICATION SYSTEM AND METHOD THEREOF

(71) Applicant: AGENCY FOR DEFENSE DEVELOPMENT, Daejeon (KR)

(72) Inventors: Inwoong Kang, Daejeon (KR); Jaedon Park, Daejeon (KR); Jong Sung Park, Daejeon (KR); Taehoon Kim, Daejeon (KR)

(73) Assignee: Agency for Defense Development, Daejeon (KR)

( * ) Notice: Subject to any disclaimer, the term of this patent is extended or adjusted under 35 U.S.C. 154(b) by 0 days.

(21) Appl. No.: 17/177,005

(22) Filed: Feb. 16, 2021

(65) Prior Publication Data
US 2021/0258134 A1 Aug. 19, 2021

(30) Foreign Application Priority Data
Feb. 19, 2020 (KR) .................. 10-2020-0020595

(51) Int. Cl.
*H04L 5/14* (2006.01)
(52) U.S. Cl.
CPC .................. *H04L 5/1461* (2013.01)
(58) Field of Classification Search
CPC ....... H04L 5/1461; H04B 1/123; H04B 1/525; H04B 1/56; H04B 1/1027; H04B 1/12
See application file for complete search history.

(56) References Cited

U.S. PATENT DOCUMENTS 3,997,973 A * 12/1976 Buss ................. H01L 29/42396
327/566
9,059,768 B1 * 6/2015 Sorsby .................. H04B 1/123
(Continued)

FOREIGN PATENT DOCUMENTS

KR  10-2016-0059975 A  5/2016
KR  10-2016-0092513 A  8/2016

OTHER PUBLICATIONS

Dinesh Bharadia, Emily McMilin, and Sachin Katti. 2013. Full duplex radios. SIGCOMM Comput. Commun. Rev. 43, 4 (Oct. 2013), 375-386. DOI:https://doi.org/10.1145/2534169.2486033 (Year: 2013).*

(Continued)

*Primary Examiner* — Ayaz R Sheikh
*Assistant Examiner* — Tarella A Hampton
(74) *Attorney, Agent, or Firm* — Knobbe, Martens, Olson & Bear, LLP (57) ABSTRACT

This application relates to a full duplex communication device. In one aspect, the device includes a transmission/reception antenna configured to receive a received signal corresponding to a transmitted signal. The device may also include an analog cancellation unit configured to set values of elements constituting an analog cancellation circuit and cancel an interference signal included in the received signal using the set values of the elements constituting the analog cancellation circuit. The device may further include a digital cancellation unit configured to cancel a remaining interference signal included in the received signal. Some embodiments can minimize the influence of distortion of a transmitted signal due to non-linearity of a power amplifier during an active analog self-interference cancellation process.

16 Claims, 7 Drawing Sheets

(56) References Cited

U.S. PATENT DOCUMENTS

| | | | |
|---|---|---|---|
| 2003/0189974 A1* | 10/2003 | Ferry | H04L 5/06 |
| | | | 375/219 |
| 2010/0118922 A1* | 5/2010 | Ahn | H04B 7/15585 |
| | | | 375/214 |
| 2013/0286903 A1* | 10/2013 | Khojastepour | H04B 1/525 |
| | | | 370/280 |
| 2019/0044555 A1* | 2/2019 | Hewavithana | H04L 12/2801 |

OTHER PUBLICATIONS

L. Li, A. Song, L. J. Cimini, Xiang-Gen Xia and Chien-Chung Shen, "Interference cancellation in in-band full-duplex underwater acoustic systems," OCEANS 2015—MTS/IEEE Washington, 2015, pp. 1-6, doi: 10.23919/OCEANS.2015.7404411. (Year: 2015).*

J. Tamminen et al., "Digitally-controlled RF self-interference canceller for full-duplex radios," 2016 24th European Signal Processing Conference (EUSIPCO), 2016, pp. 783-787, doi: 10.1109/EUSIPCO.2016.7760355. (Year: 2016).*

D. Korpi, Y. Choi, T. Huusari, L. Anttila, S. Talwar and M. Valkama, "Adaptive Nonlinear Digital Self-Interference Cancellation for Mobile Inband Full-Duplex Radio: Algorithms and RF Measurements," 2015 IEEE Global Communications Conference (GLOBECOM), 2015, pp. 1-7, doi: 10.1109/GLOCOM.2015.7417188. (Year: 2015).*

* cited by examiner

| RECEIVER NOISE LEVEL | | −100 dB | |
|---|---|---|---|
| NUMBER OF ADC BITS | | 14 BITS | |
| POWER AMPLIFIER PH MODEL ORDER | | FIFTH ORDER | |
| TRANSFER FREQUENCY | | 1.5 GHz | |
| ρ1 | | SELF-INTERFERENCE CANCELLATION PERFORMANCE | |
| | | ACTIVE ANALOG SELF-INTERFERENCE CANCELLATION OF CONVENTIONAL METHOD | ACTIVE ANALOG SELF-INTERFERENCE CANCELLATION OF PROPOSED METHOD |
| 23 dB | | 74.4660 dB | 72.8964 dB |
| | | DIGITAL NON-LINEAR SELF-INTERFERENCE CANCELLATION | DIGITAL NON-LINEAR SELF-INTERFERENCE CANCELLATION |
| | | 40.7658 dB | 42.7331 dB |
| | | ENTIRE SELF-INTERFERENCE CANCELLATION | ENTIRE SELF-INTERFERENCE CANCELLATION |
| | | 115.2318 dB | 115.6295 dB |
| | | ACTIVE ANALOG SELF-INTERFERENCE CANCELLATION OF CONVENTIONAL METHOD | ACTIVE ANALOG SELF-INTERFERENCE CANCELLATION OF PROPOSED METHOD |
| 5 dB | | 37.0702 dB | 73.0662 dB |
| | | DIGITAL NON-LINEAR SELF-INTERFERENCE CANCELLATION | DIGITAL NON-LINEAR SELF-INTERFERENCE CANCELLATION |
| | | 10.8983 dB | 42.0396 dB |
| | | ENTIRE SELF-INTERFERENCE CANCELLATION | ENTIRE SELF-INTERFERENCE CANCELLATION |
| | | 47.9684 dB | 115.1057 dB |

# DEVICE FOR SELF-INTERFERENCE CANCELLATION OF FULL DUPLEX COMMUNICATION SYSTEM AND METHOD THEREOF

CROSS-REFERENCE TO RELATED APPLICATION

This application claims priority to Korean Patent Application No. 10-2020-0020595, filed on Feb. 19, 2020. The entire contents of the application on which the priority is based are incorporated herein by reference.

TECHNICAL FIELD

The described technology relates to a self-interference cancellation control device and control method of a communication system, and more specifically, to a self-interference cancellation control device and control method of a communication system in consideration of nonlinearity of a power amplifier.

BACKGROUND

In general, a full duplex communication system is technology by which a transmitter and a receiver can simultaneously perform transmission and reception in the same band to increase channel capacity about twice.

To cancel self-interference generated during transmission and reception processes in a full duplex communication system for increasing channel capacity, research on self-interference signal cancellation techniques has been conducted.

SUMMARY

According to some embodiments, a self-interference cancellation control device and control method of a communication system can minimize the influence of distortion of a transmitted signal due to non-linearity of a power amplifier during an active analog self-interference cancellation process.

The analog cancellation unit may measure an impulse response of the analog cancellation circuit to set the values of the elements constituting the analog cancellation circuit and estimates the interference signal using the set values of the elements.

The analog cancellation unit may cancel the estimated interference signal from the received signal, down-converts the frequency of the received signal and transmits the frequency-down-converted signal to the digital cancellation unit.

The digital cancellation unit may estimate the remaining interference signal using a pilot signal transmitted from the transmission/reception antenna and the frequency-down-converted received signal.

The digital cancellation unit may cancel the remaining interference signal from the received signal from which the interference signal has been canceled. Further comprising a modulator configured to generate the transmitted signal; and a transmitter configured to amplify the generated transmitted signal and up-convert the frequency of the amplified signal.

The digital cancellation unit may receive the transmitted signal and the received signal from which the remaining interference signal has been canceled and performs an arithmetic operation of separating a linear component of the transmitted signal.

The analog cancellation unit may include an adjustment algorithm for receiving the separated linear component and performing an arithmetic operation of setting the values of the elements.

According to an embodiment of the described technology, a full duplex communication method of a full duplex communication device, comprising: receiving a received signal corresponding to a transmitted signal using a transmission/reception antenna, setting values of elements constituting an analog cancellation circuit using an analog cancellation unit and canceling an interference signal included in the received signal using the set analog cancellation circuit; and canceling a remaining interference signal included in the received signal using a digital cancellation unit.

The canceling of the interference signal may included in the received signal comprises: measuring an impulse response of the analog cancellation circuit to set the values of the elements constituting the analog cancellation circuit; estimating the interference signal using the set values of the elements; and canceling the interference signal from the received signal using the estimated interference signal.

Further comprising canceling the estimated interference signal from the received signal, down-converting the frequency of the received signal and transmitting the frequency-down-converted signal to the digital cancellation unit.

The canceling of the remaining interference signal included in the received signal comprises estimating the remaining interference signal using a pilot signal transmitted from the transmission/reception antenna and the frequency-down-converted received signal.

The canceling of the remaining interference signal included in the received signal comprises canceling the remaining interference signal from the frequency-down-converted received signal using the estimated remaining interference signal.

Further comprising: a modulator generating the transmitted signal; and a transmitter amplifying the generated transmitted signal and up-converting the frequency of the amplified signal.

The setting of the values of the elements constituting the analog cancellation circuit using the analog cancellation unit may comprise the digital cancellation unit receiving the transmitted signal and the received signal from which the remaining interference signal has been canceled and performing an arithmetic operation of separating a linear component of the transmitted signal.

The setting of the values of the elements constituting the analog cancellation circuit using the analog cancellation unit may comprise the analog cancellation unit setting an adjustment algorithm to receive the separated linear component and perform an arithmetic operation of setting the values of the elements.

DETAILED DESCRIPTION

Typical self-interference signal cancellation methods cancel self-interference signals by estimating self-interference channel characteristics from a difference between a transmitted signal supplied from a transmitter and a self-interference signal and canceling a self-interference signal estimate value generated using the estimated self-interference channel characteristics from received signals. Specifically, these methods use a process of using an analog circuit and a process of using digital signal processing together.

When an analog self-interference cancellation method is used, signal leakage of transmission/reception antennas and linear self-interference channels including multi-path channels can be estimated and canceled. Then, a remaining self-interference signal from which analog self-interference has been cancelled is down-converted and converted into a digital signal in a receiver and additionally canceled in a digital domain.

Here, a transmitted signal provided to the receiver is non-linear due to non-linear characteristics of a power amplifier after subjected to the power amplifier, and self-interference is cancelled in consideration of the non-linearity of the signal using a digital self-interference cancellation method. However, the above methods have problems that a self-interference channel including non-linearity of a signal due to a power amplifier is estimated and the self-interference cancellation performance of the full duplex communication system is reduced.

Hereinafter, a full duplex communication device according to an embodiment of the described technology will be described with reference to FIG. 1.

Figure 1:
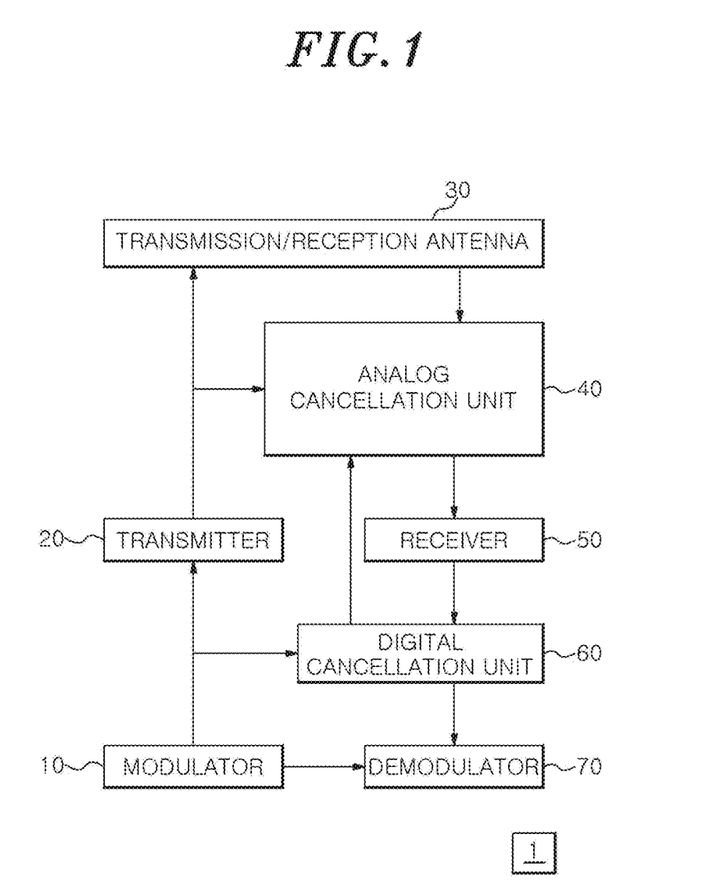
FIG. 1 is a block diagram for describing a full duplex communication device according to an embodiment of the described technology.

FIG. 1 is a block diagram for describing a full duplex communication device according to an embodiment of the described technology.

A full duplex communication device 1 refers to a device in which a transmitter and a receiver simultaneously perform transmission and reception in the same band.

The full duplex communication device 1 includes a modulator 10, a transmitter 20, a transmission/reception antenna 30, an analog cancellation unit 40, a receiver 50, a digital cancellation unit 60, and a demodulator 70.

The modulator 10 generates a baseband digital signal.

The transmitter 20 amplifies and frequency-up-converts the baseband digital signal generated by the modulator 10.

The transmission/reception antenna 30 may be used to transmit/receive the signal amplified and frequency-up-converted by the transmitter 20.

The analog cancellation unit 40 may cancel a self-interference signal included in the signal received by the transmission/reception antenna 30.

Specifically, the signal transmitted from the transmission/reception antenna 30 is distorted in the transmission/reception antenna 30 due to signal leakage and multiple paths and thus the self-reference signal received by the transmission/reception antenna 30 is received along with the signal that needs to be actually received.

The receiver 50 frequency-down-converts the signal from which the self-reference signal has been canceled into a baseband digital signal.

The digital cancellation unit 60 may cancel a remaining self-reference signal included in the received signal from which the self-reference signal has been canceled.

The demodulator 70 demodulates the signal from which the remaining self-reference signal has been canceled. Further, the demodulator 70 may directly receive the baseband signal generated by the modulator 10 and compare the same with the demodulated signal after cancellation of the remaining self-interference signal.

Hereinafter, a full duplex communication method according to an embodiment of the described technology will be described with reference to FIG. 2.

Figure 2:
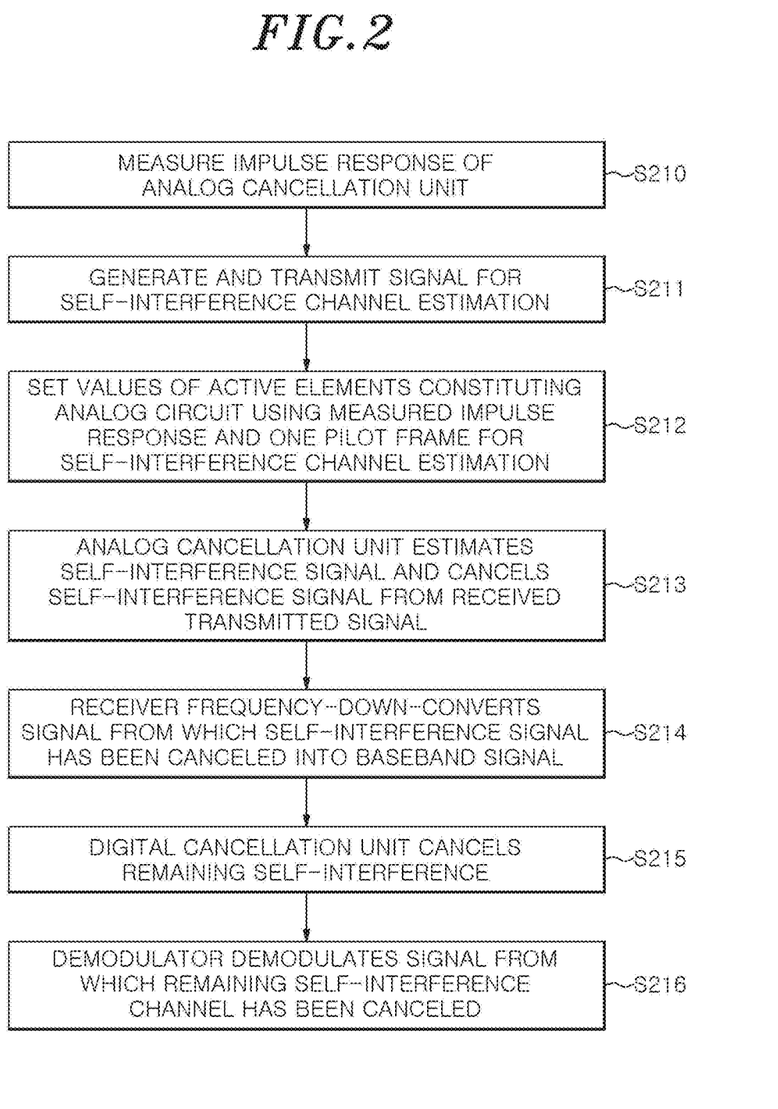
FIG. 2 is a flowchart for describing a full duplex communication method according to an embodiment of the described technology.

FIG. 2 is a flowchart for describing the full duplex communication method according to an embodiment of the described technology.

In step S210, an impulse response of an analog circuit constituting the analog cancellation unit 40 is measured.

Specifically, the impulse response of the analog circuit constituting the analog cancellation unit 40 is measured without connection with the transmitter 20, the transmission/reception antenna 30 and the receiver 50.

In step S211, a signal for self-interference channel estimation is generated and transmitted.

Specifically, the transmitter 20, the transmission/reception antenna 30 and the receiver 50 are connected to the analog cancellation unit 40, and then the modulator 10 generates a baseband signal including one pilot frame and ($N_{Frame}-1$) data frames for self-interference channel estimation. The generated baseband signal is frequency-up-converted by the transmitter 20 and transmitted through the transmission/reception antenna 30.

In step S212, values of active elements constituting the analog circuit are set using the measured impulse response and the one pilot frame for self-interference channel estimation.

Specifically, after the entire circuit constituting the full duplex communication device 1 is constructed, values of active elements constituting the analog circuit are set using the one pilot signal for channel estimation and the measured impulse response. Here, the active elements may include a time delay, an attenuator and a phase shifter. However, it is assumed that the value of the time delay is fixed in the described technology.

In step S213, the analog cancellation unit 30 estimates a self-interference signal and cancels the self-interference signal from the received transmitted signal.

Specifically, the signal generated by the modulator 10 may include a self-interference signal when received by the transmission/reception antenna 30. Here, the analog cancellation unit 40 estimates the self-interference signal using the set active element values and cancels the estimated self-interference signal from the signal received by the transmission/reception antenna 30.

In step S214, the signal from which the self-interference signal has been canceled is frequency-down-converted by the receiver 50 into a baseband signal.

In step S215, the digital cancellation unit 60 cancels remaining self-interference.

Specifically, remaining self-interference is present in the received signal even after the self-interference signal is primarily canceled by the analog cancellation unit 40. That is, remaining self-interference estimated in the digital cancellation unit 60 is canceled from the ($N_{Frame}-1$) data frames.

In step S216, the demodulator 70 demodulates the signal from which the remaining self-interference has been canceled.

Hereinafter, the full duplex communication method illustrated in FIG. 2 will be described in detail with reference to FIG. 3.

Figure 3:
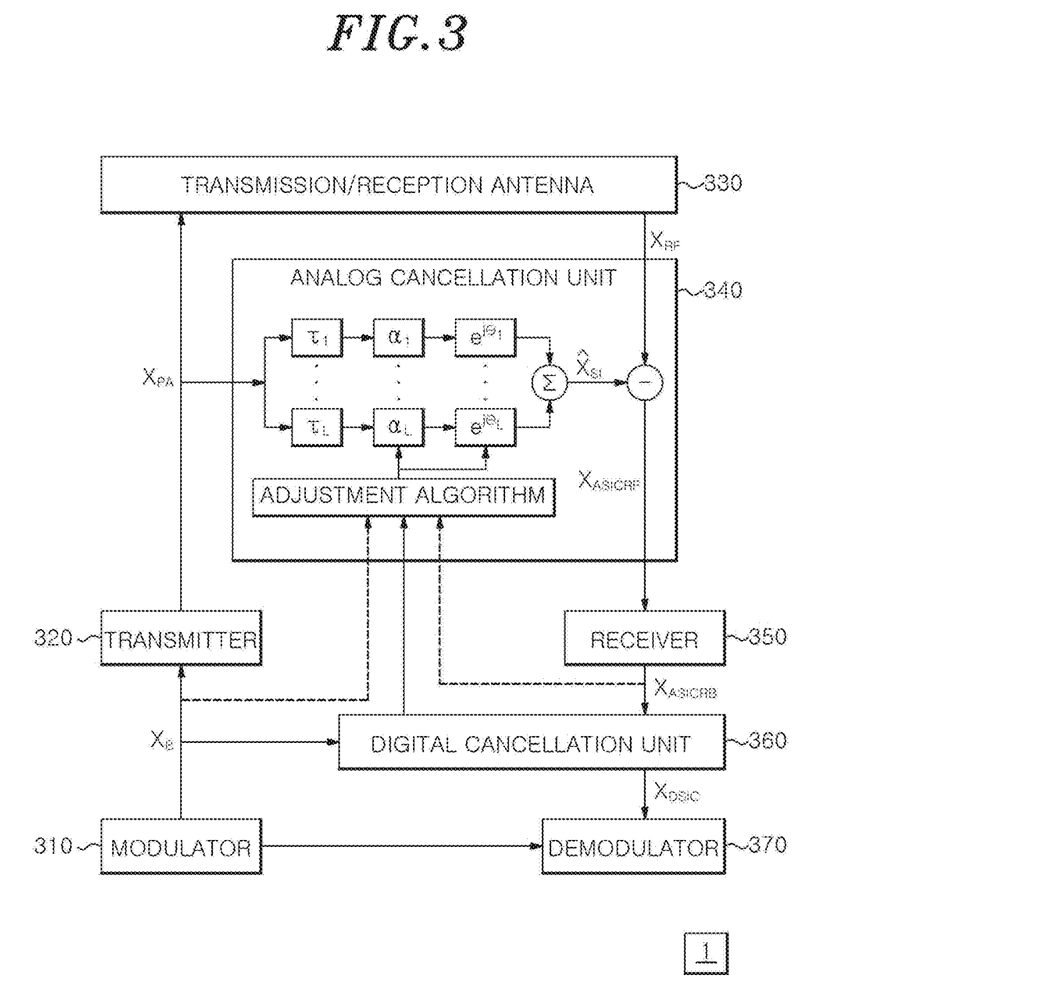
FIG. 3 is a block diagram for describing the full duplex communication method of FIG. 2 in detail.

FIG. 3 is a block diagram for describing the full duplex communication method illustrated in FIG. 2 in detail.

A modulator 310 generates a digital baseband signal $x_B$.

A transmitter 320 amplifies and frequency-up-converts the generated digital signal $x_B$ to generate a signal $x_{PA}$.

A transmission/reception antenna 330 transmits the converted signal $x_{PA}$ to the air.

A signal $x_{RF}$ distorted due to signal leakage and multiple paths in the transmission/reception antenna 330 is received by the transmission/reception antenna 330. A self-interference signal included in the received signal $x_{RF}$ is received along with the signal that needs to be actually received.

An analog cancellation unit 340 cancels the self-interference signal $\vec{x}_{SI}$ from the received signal $x_{RF}$.

A receiver 350 down-converts the frequency of a signal $x_{ASICRF}$ from which the self-interference signal has been canceled to convert the signal $x_{ASICRF}$ into a digital baseband signal $x_{ASICB}$.

A digital cancellation unit 360 cancels a remaining self-interference signal included in the converted digital baseband signal $x_{ASICB}$ to generate a signal $x_{DSIC}$ and transmits the signal $x_{DSIC}$ to a demodulator 370.

The demodulator 370 demodulates the transmitted signal from the signal $x_{DSIC}$.

Hereinafter, a step of estimating and canceling a self-interference signal in the analog cancellation unit according to an embodiment of the described technology will be described with reference to FIG. 4.

Figure 4:
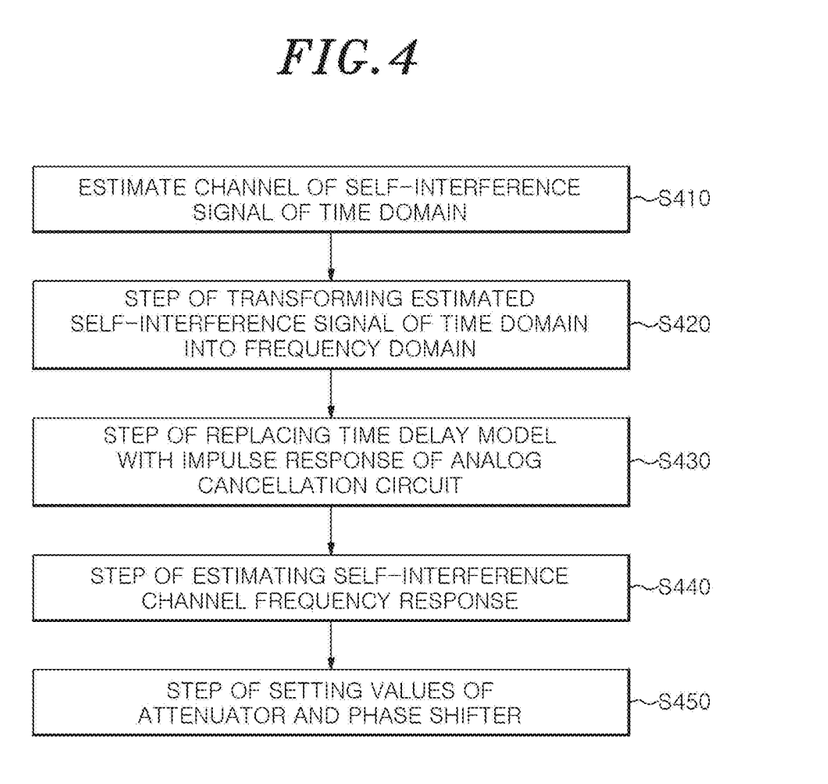
FIG. 4 is a diagram for describing a step of estimating and canceling an interference signal in an analog cancellation unit according to an embodiment of the described technology.

FIG. 4 is a diagram for describing the step of estimating and canceling a self-interference signal in the analog cancellation unit according to an embodiment of the described technology.

Hereinafter, a transmitted signal and a self-interference signal will be mathematically modeled and described in a method of estimating a self-interference signal by the analog cancellation unit.

The output signal $x_{RF}$ of the transmission/reception antenna may be represented by [FORMULA 1].

$$x_{RF}(t)=y(t)+h_{SI}(t)*x_{PA}(t)+w(t) \quad \text{[FORMULA 1]}$$

Here, y(t) denotes a received signal, $h_{SI}(t)$ denotes a self-interference channel impulse response, $x_{PA}(t)$ denotes an output signal of a power amplifier, and w(t) denotes white noise.

It is assumed that only the self-interference signal is present without the received signal y(t) in the step in which the analog cancellation unit of the described technology cancels the self-interference signal. This means that the impulse response of the analog circuit constituting the analog cancellation unit is measured without connection with the transmitter, the transmission/reception antenna and the receiver.

Here, the output signal $x_{RF}$ of the transmission/reception antenna may be represented by [FORMULA 2].

$$x_{RF}(t)=h_{SI}(t)*x_{PA}(t)+w(t) \quad \text{[FORMULA 2]}$$

Further, circuits constituting the analog cancellation unit include a time delay, an attenuator and a phase shifter.

It is assumed that the value of the time delay is fixed in the described technology.

In step S410, a channel of a self-interference signal $\hat{x}_{SI}(t)$ of the time domain is estimated.

Specifically, the a self-interference signal $\hat{x}_{SI}(t)$ to be estimated in the analog cancellation unit may be represented by [FORMULA 3] in the time domain.

$$\hat{x}_{SI}(t) = \hat{h}_{SI}(t) * x_{PA}(t) = \left(\sum_{i=1}^{L} \alpha_i e^{i\theta}\delta(t-\tau_i)\right) * x_{PA}(t) \quad \text{[FORMULA 3]}$$

$\hat{h}_{SI}$ denotes a self-interference channel impulse response imitating the analog cancellation circuit, $\tau_i$, denotes a time delay value, $\alpha_i$ denotes an attenuator value, $\theta_i$ denotes a phase shifter value, and L denotes a total number of taps.

In step S420, the self-interference signal $\hat{x}_{SI}(t)$ of the time domain is transformed into the frequency domain.

Specifically, [FORMULA 3] may be transformed into the frequency domain of [FORMULA 4] in order to estimate the self-interference channel impulse response $\hat{h}_{SI}$ imitating the analog cancellation circuit without arithmetic operation of convolution.

$$\hat{X}_{SI}(f)=\hat{H}_{SI}(f)*X_{PA}(f)=D_f^T A X_{PA}(f) \quad \text{[FORMULA 4]}$$

$\hat{x}_{SI}(f)$ represents a Fourier transform of $\hat{x}_{SP}$, $\hat{H}_{SI}(f)$ represents a Fourier transform of $\hat{h}_{SP}$, and $X_{PA}(f)$ represents a signal of a Fourier transformed frequency domain of $x_{PA}$.

In addition, $D_f$ is an expression of a time delay value in the frequency domain, A is an expression of attenuator and phase shifter values $\alpha_i$ and $\theta_i$ in the frequency domain.

The frequency domain $D_f$ of the time delay value $\tau_i$, may be represented by [FORMULA 5].

$$D_f=[e^{-j2\pi f T_1} \ldots e^{-j2\pi f T_L}]^T; \quad \text{[FORMULA 5]}$$

In addition, the frequency domain A of the attenuator and phase shifter values may be represented by [FORMULA 6].

$$A=[a_1 e^{j\theta_1} \ldots a_L e^{j\theta_L}]^T. \quad \text{[FORMULA 6]}$$

Here, when the frequency domain value $D_f$ of the time delay value is fixed, [FORMULA 6] may be represented as [FORMULA 7].

$$\hat{A}=\min_{a_1,\theta_1}[(H_{SI}[k]-D_k^T A)^H (H_{SI}[k]-D_k^T A)] \quad \text{[FORMULA 7]}$$

Here, $H_{SI}[k]=H_{SI}(j\Delta_\omega k)$, $D_k=D_{j\Delta_x 5}$, $\Delta_x=2\pi f/K$, wherein K is a Fourier transform magnitude that determines a resolution of frequency sampling.

An expression for setting attenuator and phase shifter values may be represented as [FORMULA 8] using the solution of [FORMULA 7].

$$\hat{A}=[\overline{D_k}D_k^T]^{-1}H_{SI}[k]D_k^T. \quad \text{[FORMULA 8]}$$

In [FORMULA 8], $\overline{D_k}$ is a vector obtaining by applying a conjugate to all elements of.

In step S430, a time delay model is substituted with the impulse response of the analog cancellation circuit.

Specifically, the actual channel impulse response of the analog cancellation circuit differs from FORMULAs 3 to 6 that represent simple linear models of active elements constituting the circuit.

That is, the channel impulse response of the analog cancellation circuit in which the time delay value $\tau_i$, is fixed to a specific value is different from $\hat{h}_{SP}$ of [FORMULA 3] due to various factors of the actual circuit.

Accordingly, [FORMULA 7] that is the time delay model is substituted with an impulse response measurement value of the analog cancellation circuit, instead of [FORMULA 6] that is a model corresponding to the attenuator and the phase shifter which actively set element values in response to change in the self-interference channel.

Furthermore, the values of the attenuator and the phase shifter are set to 1 and 0, and frequency response before adjustment of values for self-interference cancellation is measured.

In addition, a pilot frame and data frames composed of real data are transmitted through the transmission/reception antenna.

Specifically, after the values of the attenuator and the phase shifter are set, the modulator transmits one pilot frame and ($N_{Frame}-1$) data frames composed of real data through the transmitter and the transmission/reception antenna.

Hereinafter, a process in which the analog cancellation unit estimates the self-interference signal $\hat{x}_{SI}(t)$ using the one transmitted pilot frame will be described.

In step S440, a self-interference channel frequency response is measured.

Specifically, when a measured frequency response of the analog cancellation circuit is $H_{CIR}[k]$, [FORMULA 7] may be represented as [FORMULA 9].

$$\hat{A} = \min_{a_1,\theta_1} \| H_{SI} - H_{CIR} A \|^2. \qquad \text{[FORMULA 9]}$$

Here, $H_{SI}$ may be represented by [FORMULA 10].

$$H_{SI} = [H_{SI}[1], \ldots, H_{SI}[K]]^T \qquad \text{[FORMULA 10]}$$

Further, $H_{CIR}$ may be represented by [FORMULA 11].

$$H_{CIR} = [H_{CIR,1} | \ldots | H_{CIR,L}] \qquad \text{[FORMULA 11]}$$

Further, $H_{CIR,l}$ may be represented by [FORMULA 12].

$$H_{CIR,l} = [H_{CIR,l}[1], \ldots, H_{CIR,l}[K]]^T. \qquad \text{[FORMULA 12]}$$

A result of calculation of the least squares method solution of [FORMULA 9] using [FORMULA 10] to [FORMULA 12] may be represented as [FORMULA 13].

$$\hat{A} = [H_{CIR}^H H_{CIR}]^{-1} H_{CIR}^H H_{SI}. \qquad \text{[FORMULA 13]}$$

Here, although estimation of $H_{SI}=[H_{SI}[1], \ldots, H_{SI}[K]]^T$ which is the self-interference channel frequency response needs to ideally start with definition of a difference between the transmitter output $x_{PA}$ that is an input signal of the self-interference channel and the transmission/reception antenna output signal $x_{RF}$ as a self-interference channel, it is impossible to perform signal processing of the frequency response using an analog domain signal.

Accordingly, a difference between the digital domain baseband signal $x_B$ of the modulator and the receiver output signal $x_{ASICB}$ is defined as a self-interference channel to estimate a self-interference signal.

Here, a self-interference channel frequency response is estimated using the frequency-converted signal $x_B$ of the digital domain baseband signal $x_B$ of the modulator and the frequency-converted signal $x_{ASICB}$ of the receiver output signal $x_{ASICB}$. This may be represented as [FORMULA 14].

$$X_{ASICB}[k] = H_{SI}[k] X_B[k] + W[k];$$

$$\hat{H}_{SI}[k] = X_{ASICB}[k]/X_B[k]. \qquad \text{[FORMULA 14]}$$

In step S450, values of the attenuator and the phase shifter are set.

Specifically, $\hat{H}_{SI}$ calculated using [FORMULA 14] is inserted into [FORMULA 13] to set the values of the phase shifter and the attenuator constituting the analog cancellation circuit.

Hereinafter, a step of estimating and canceling a self-interference signal in the digital cancellation unit according to an embodiment of the described technology will be described with reference to FIG. 5.

Figure 5:
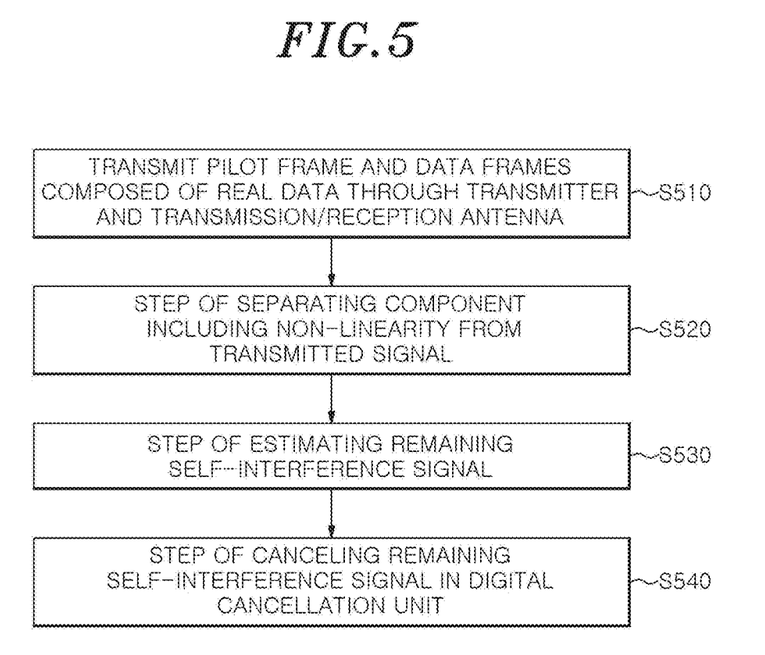
FIG. 5 is a diagram for describing a step of estimating and canceling a remaining interference signal in a digital cancellation unit according to an embodiment of the described technology.

FIG. 5 is a diagram for describing the step of estimating and canceling a remaining self-interference signal in the digital cancellation unit according to an embodiment of the described technology.

In step S510, a pilot frame and data frames composed of real data are transmitted through the transmission/reception antenna.

Specifically, after the values of the attenuator and the phase shifter are set, one pilot frame and ($N_{Frame}-1$) data frames composed of real data are transmitted through the transmitter and the transmission/reception antenna. This transmission process is the same as step S211 of FIG. 2 and may be used to estimate a self-interference signal in the analog cancellation unit or to estimate a remaining self-interference signal in the digital cancellation unit.

The signal $x_{ASICRF}$ that has passed through the analog cancellation unit passes through the receiver to generate a baseband signal $x_{ASICB}$.

The baseband time domain signal $x_{ASICB}$ that is the receiver output includes a remaining self-interference signal and non-linear signal distortion due to intermodulation characteristics of a power amplifier in the transmitter.

Here, the remaining self-interference signal is estimated and canceled using the parallel Hammerstein (PH) modeling.

In step S520, a component having non-linearity is separated from the transmitted signal.

Specifically, non-linearity of the output $x_{PA}$ of the power amplifier in the transmitter may be represented as [FORMULA 15].

$$x_{PA}[n] = \sum_{\substack{p=1 \\ p\ odd}}^{P} \sum_{k=1}^{K} (\beta_p[k]) |x_B[n-k]|^p. \qquad \text{[FORMULA 15]}$$

In [FORMULA 15], all signals are discrete signals defined such as $x_{PA}[n] \equiv x_{PA}(t+\Delta_\tau k)$, and $\beta_p[k]$ and P respectively indicate a finite filter impulse response (FIR) coefficient with respect to a P-order intermodulation component in the PH model and a highest order value of the PH model.

That is, $x_{PA}[n]$ is composed of a linear combination of odd-numbered order terms of the transmitter input signal $x_B$, and a signal $x_{ASICB}[n]$ from which the self-interference signal has been primarily canceled by the analog cancellation unit may also be PH modeled. This may be represented as [FORMULA 16].

$$x_{ASICB}[n] = x_{RF}[n] - \hat{x}_{SI}[n] \qquad \text{[FORMULA 16]}$$

$$= h_{SI}[n] * x_{PA}[n] - \hat{h}_{SI}[n] * x_{PA}[n] + w[n]$$

-continued $$= \sum_{\substack{p=1 \\ p \text{ odd}}}^{P} \sum_{k=1}^{K} ((h_{SI}[k] - \hat{h}_{SI}[k] * b_p[k])|x_B[n-k]|^p - w[n]$$

$$= \sum_{\substack{p=1 \\ p \text{ odd}}}^{P} \sum_{k=1}^{K} (g[k])|x_B[n-k]|^p + w[n].$$

Here, $g_b[k]$ is defined as convolution of a channel impulse response and $b_p[k]$ after the self-interference channel is primarily canceled by the analog cancellation circuit. $g_b[k] = (h_{SI}[k] - \hat{h}_{SI}[k]) * b_p[k]$.

In step S530, the remaining self-interference signal is estimated.

Specifically, a signal vector $x_{DSK}$ obtained by canceling remaining self-interference from the PH-modeled signal $x_{ASICB}[n]$ through the digital cancellation unit is defined as [FORMULA 17].

$$x_{DSIC} = x_{ASICB} - X_{PH} g. \quad \text{[FORMULA 17]}$$

Here, related matrices and vectors may be represented as [FORMULA 18].

$$x_{ASICB} = [x_{ASICB}[1], \ldots, x_{ASICB}[K]]^T;$$

$$g = [g_1^T, \ldots, g_P^T]^T;$$

$$g_p = [g_p[-Q], \ldots, g_p[R]]^T;$$

$$x_{PH} = [x_1, x_3, \ldots, x_P];$$

$$x_P = [x_{B,-Q}^P | x_{B,(-Q+1)}^P | \ldots | x_{B,R}^P];$$

$$x_{B,o}^P = [x^p[n-o+1], \ldots, x^p[n-o+L]]^T. \quad \text{[FORMULA 18]}$$

Here, in the vector g, a remaining interference channel component after analog interference cancellation which needs to be estimated by a digital interference cancellation unit and a non-linear signal distortion component generated in the power amplifier are combined.

Particularly, from among vector components $g_p$ constituting the vector g, the first vector component $g_1$ is a linear output component in the power amplifier output.

The remaining elements $g_p$ (p=3, 5, ... P) are non-linear components due to intermodulation in the power amplifier output.

An issue of estimating the vector g to minimize the remaining self-interference signal may be represented as [FORMULA 19].

$$\hat{g} = \arg\min_g \|x_{ASICB} - x_{PH} g\|^2 \quad \text{[FORMULA 19]}$$

Further, an expression of obtaining a solution according to [FORMULA 19] may be represented as [FORMULA 20].

$$\hat{g} = (x_{PH}^H x_{PH})^{-1} x_{PH}^H x_{ASICB}. \quad \text{[FORMULA 20]}$$

Here, a final self-interference cancellation signal $x_{DSK}$ is generated by inserting a vector $\hat{g}$ that is the estimation result of [FORMULA 20] into [FORMULA 17].

Further, the process of generating the vector $\hat{g}$ is performed using an additional pilot frame prepared for this process, and the generated vector $\hat{g}$ is not changed until the self-interference channel changes by a predetermined level or more and is used for a digital self-interference cancellation process for a number of data frames determined by the system after stored in a memory of the digital cancellation unit.

In addition, the frequency of estimating $\hat{g}$ may be designed based on a channel environment in which the system is operated.

In step S510, the estimated remaining self-interference signal is cancelled by the digital cancellation unit.

Hereinafter, an analog interference cancellation step using a digital interference cancellation step according to an embodiment of the described technology will be described with reference to FIG. 6.

Figure 6:
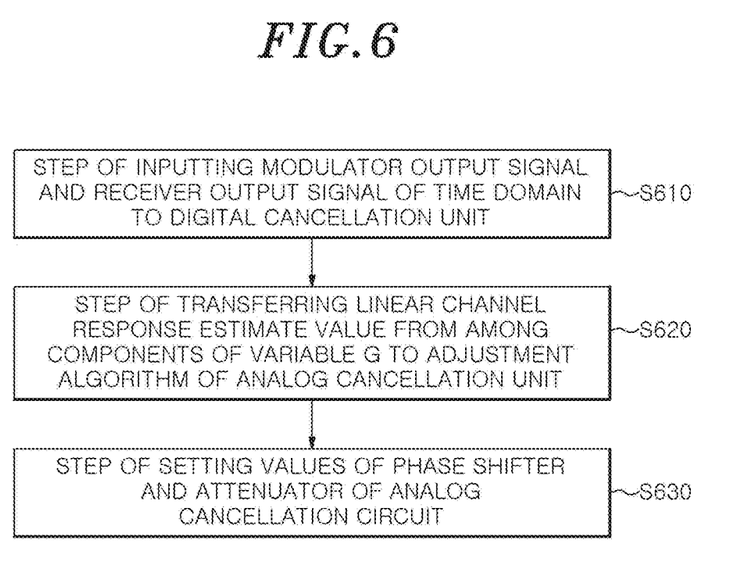
FIG. 6 is a diagram for describing an analog interference cancellation step using a digital interference cancellation step according to an embodiment of the described technology.

FIG. 6 is a diagram describing the analog interference cancellation step using a digital interference cancellation step according to an embodiment of the described technology.

In estimation of a self-interference channel through the analog interference cancellation unit, non-linear signal distortion due to a power amplifier is included in a channel estimation result in the model according to [FORMULA 14].

Accordingly, to estimate a self-interference channel without having signal distortion duet to the power amplifier included therein, characteristics in which $\hat{g}$ is estimated such that the output of the digital cancellation unit is separated into a linear component and a non-linear component are used.

In step S610, the output signal $x_B$ of the modulator and the output signal $x_{ASICB}$ of the receiver in the time domain are input to the digital cancellation unit.

Specifically, while the modulator output signal $X_B$ and the receiver output signal $X_{ASICB}$ which are baseband frequency domain digital signals are used for self-interference channel estimation in [FORMULA 14], the time domain signals $x_B$ and $x_{ASICB}$ of the same signals are input to the digital cancellation unit so that [FORMULA 19] is solved as [FORMULA 20].

According to the definition of g in [FORMULA 18], first (Q+R+1) elements of $g_1$ are estimate values of a linear channel response that is a coefficient of $x_B$ in the PH model, and the remaining elements of g correspond to non-linear channel response of odd-numbered orders of $x_B$.

In step S620, linear channel response estimate values from among components of the variable g are transferred to an adjustment algorithm of the analog cancellation unit.

Here, when the digital cancellation unit estimates $g_1$ and transfers $g_1$ to the adjustment algorithm of the analog cancellation unit, the adjustment algorithm converts $g_1$ into a frequency signal $G_1$ and then inserts the frequency signal $G_1$ into $H_{SI}$ of [FORMULA 13].

In step S630, the values of the attenuator and the phase shifter of the analog cancellation circuit can be set using [FORMULA 13].

Hereinafter, experimental results of a self-interference cancellation control method according to an embodiment of the described technology will be described with reference to FIG. 7.

Figure 7:
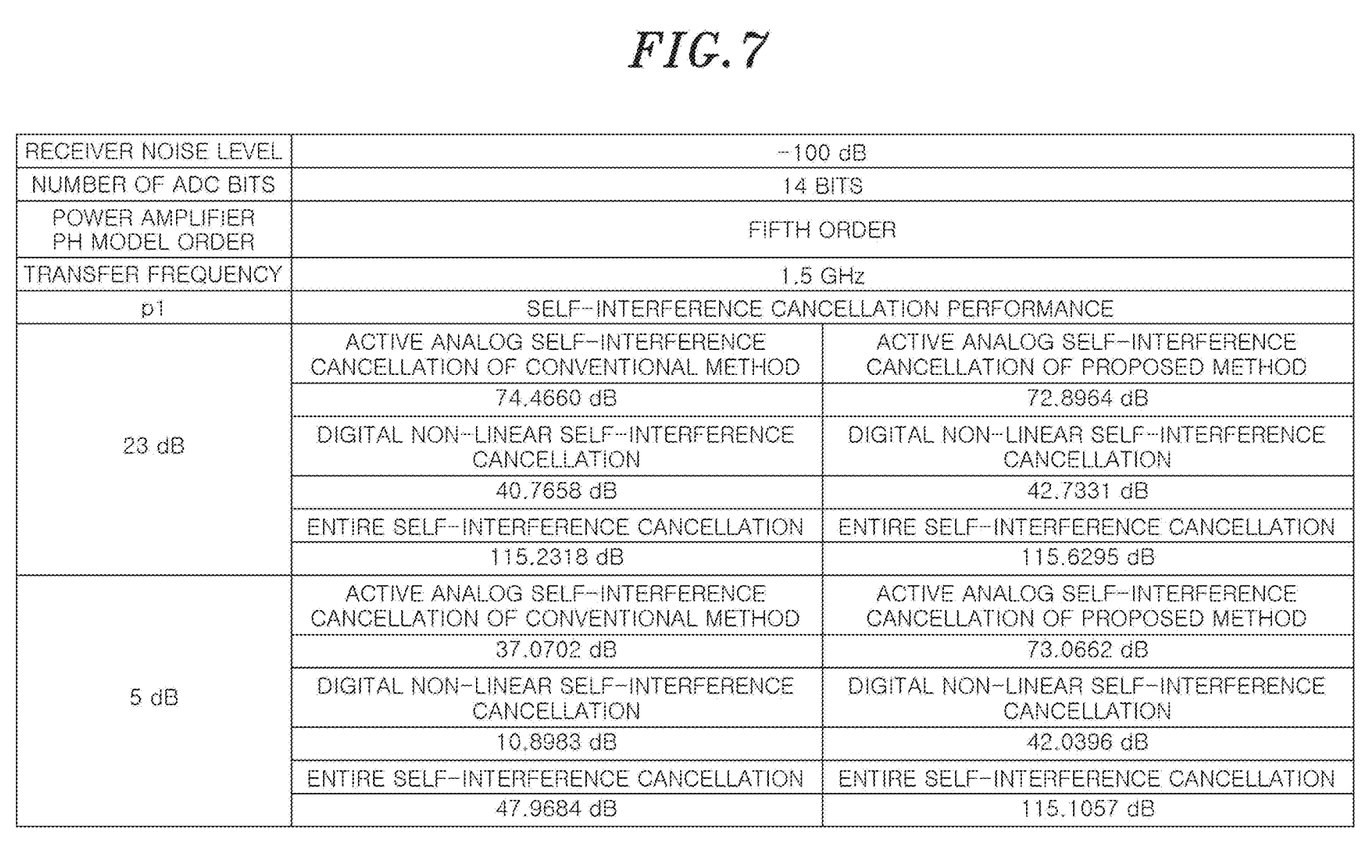
FIG. 7 is a diagram for describing experimental results of a self-interference cancellation control method according to an embodiment of the described technology.

FIG. 7 is a diagram describing experimental results of the self-interference cancellation control method according to an embodiment of the described technology.

When the value p1 corresponding to very low non-linearity of the power amplifier is 23 dB, a difference between the conventional method and the self-interference cancellation method (digital NL SIC aided method) of the described technology is insignificant in self-interference cancellation performance.

Specifically, 74.4660 dB can be canceled using analog self-interference cancellation and 40.7658 dB can be canceled using digital non-linear self-interference cancellation, and thus self-interference of a total of 115.2318 dB can be canceled in the conventional method.

In contrast, 72.8964 dB can be canceled using analog self-interference cancellation and 42.7331 dB can be canceled using digital non-linear self-interference cancellation, and thus self-interference of a total of 115.6295 dB can be canceled in the described technology, and thus it can be ascertained that a difference between the conventional method and the present inventing is insignificant.

However, when the value p1 is 5 dB, a non-linear distortion component is introduced to reduce self-interference cancellation performance in the case of the conventional method, whereas the self-interference cancellation method of the described technology exhibits robust self-interference cancellation performance even if non-linearity increases.

Specifically, 37.0702 dB can be canceled using analog self-interference cancellation and 10.8983 dB can be canceled using digital non-linear self-interference cancellation, and thus self-interference of a total of 47.9684 dB can be canceled in the conventional method.

In contrast, 73.0662 dB can be canceled using analog self-interference cancellation and 42.0396 dB can be canceled using digital non-linear self-interference cancellation, and thus self-interference of a total of 115.1057 dB can be canceled in the described technology, and thus it can be ascertained that the described technology exhibits robust self-interference cancellation performance even if non-linearity increases.

What is claimed is:

1. A full duplex communication device comprising:
   a transmission/reception antenna configured to receive a received signal corresponding to a transmitted signal;
   an analog cancellation unit configured to set values of elements constituting an analog cancellation circuit and cancel an interference signal included in the received signal using the set values of the elements constituting the analog cancellation circuit; and
   a digital cancellation unit configured to cancel a remaining interference signal included in the received signal, wherein the digital cancellation unit is configured to separate a linear component of the transmitted signal, and
   wherein the analog cancellation unit is configured to receive the linear component of the transmitted signal and set the values of elements constituting the analog cancellation circuit using the linear component of the transmitted signal.

2. The full duplex communication device of claim 1, wherein the analog cancellation unit is configured to measure an impulse response of the analog cancellation circuit to set the values of the elements constituting the analog cancellation circuit and estimate the interference signal using the set values of the elements.

3. The full duplex communication device of claim 2, wherein the analog cancellation unit is configured to cancel the estimated interference signal from the received signal, down-convert the frequency of the received signal and transmit the frequency-down-converted signal to the digital cancellation unit.

4. The full duplex communication device of claim 3, wherein the digital cancellation unit is configured to estimate the remaining interference signal using a pilot signal transmitted from the transmission/reception antenna and the frequency-down-converted signal.

5. The full duplex communication device of claim 4, wherein the digital cancellation unit is configured to cancel the remaining interference signal from the received signal from which the interference signal has been canceled.

6. The full duplex communication device of claim 2, further comprising:
   a modulator configured to generate the transmitted signal; and
   a transmitter configured to amplify the generated transmitted signal and up-convert the frequency of the amplified signal.

7. The full duplex communication device of claim 6, wherein the digital cancellation unit is configured to receive the transmitted signal and the received signal from which the remaining interference signal has been canceled and perform an arithmetic operation of separating the linear component of the transmitted signal.

8. The full duplex communication device of claim 7, wherein the analog cancellation unit includes an adjustment algorithm configured to receive the separated linear component and perform an arithmetic operation of setting the values of the elements.

9. A full duplex communication method of a full duplex communication device, comprising:
   receiving a received signal corresponding to a transmitted signal using a transmission/reception antenna;
   setting values of elements constituting an analog cancellation circuit using an analog cancellation unit and canceling an interference signal included in the received signal using the set values of elements constituting the analog cancellation circuit; and
   canceling a remaining interference signal included in the received signal using a digital cancellation unit,
   wherein the setting of the values of the elements comprises:
   separating g a linear component of the transmitted signal using the digital cancellation unit;
   receiving, by the analog cancellation unit, the linear component of the transmitted signal from the digital cancellation unit; and
   setting, by the analog cancellation unit, the values of elements constituting the analog cancellation circuit using the linear component of the transmitted signal.

10. The full duplex communication method 9, wherein the canceling of the interference signal included in the received signal comprises:
    measuring an impulse response of the analog cancellation circuit to set the values of the elements constituting the analog cancellation circuit;
    estimating the interference signal using the set values of the elements; and
    canceling the interference signal from the received signal using the estimated interference signal.

11. The full duplex communication method 10, further comprising canceling the estimated interference signal from the received signal, down-converting the frequency of the received signal and transmitting the frequency-down-converted signal to the digital cancellation unit.

12. The full duplex communication method of claim 11, wherein the canceling of the remaining interference signal included in the received signal comprises estimating the remaining interference signal using a pilot signal transmitted from the transmission/reception antenna and the frequency-down-converted signal.

13. The full duplex communication method of claim 12, wherein the canceling of the remaining interference signal included in the received signal comprises canceling the remaining interference signal from the frequency-down-converted signal using the estimated remaining interference signal.

14. The full duplex communication method of claim 10, further comprising:
   generating the transmitted signal using a modulator; and
   amplifying the generated transmitted signal and up-converting the frequency of the amplified signal using a transmitter.

15. The full duplex communication method of claim 14, wherein the setting of the values of the elements comprises the digital cancellation unit receiving the transmitted signal and the received signal from which the remaining interference signal has been canceled and performing an arithmetic operation of separating the linear component of the transmitted signal.

16. The full duplex communication method of claim 15, wherein the setting of the values of the elements comprises the analog cancellation unit setting an adjustment algorithm to receive the separated linear component and perform an arithmetic operation of setting the values of the elements.

* * * * *